United States Patent [19]

Peter et al.

[11] Patent Number: 4,892,718

[45] Date of Patent: Jan. 9, 1990

[54] DECONTAMINATION OF GASES BY SCRUBBING

[76] Inventors: Siegfried Peter, Lindenweg 3, D-8525 Uttenreuth; Georg Haertel, Westtorgraben 9, D-8500 Nuernberg, both of Fed. Rep. of Germany

[21] Appl. No.: 885,918

[22] Filed: Jul. 15, 1986

[30] Foreign Application Priority Data

Jul. 15, 1985 [DE] Fed. Rep. of Germany ....... 3525241

[51] Int. Cl.$^4$ .............................................. C01B 21/02
[52] U.S. Cl. .................................. 423/235; 423/245.2; 423/243; 423/DIG. 14; 423/242
[58] Field of Search ....... 423/245, 235, 243, DIG. 14, 423/245.2, 242 R, 242 A

[56] References Cited

U.S. PATENT DOCUMENTS

| | | | |
|---|---|---|---|
| 3,974,256 | 8/1976 | Wheelock et al. | 423/230 |
| 4,009,251 | 2/1977 | Mealy | 423/226 |
| 4,042,668 | 8/1977 | Balmat | 423/243 |
| 4,081,519 | 3/1978 | Whelan | 423/437 |

FOREIGN PATENT DOCUMENTS

| | | | |
|---|---|---|---|
| 1910127 | 9/1969 | Fed. Rep. of Germany | 423/242 R |
| 2460231 | 7/1975 | Fed. Rep. of Germany | 423/242 R |
| 3525241 | 1/1987 | Fed. Rep. of Germany | 423/235 |
| 2174180 | 10/1973 | France | 423/242 R |
| 494719 | 9/1970 | Switzerland | 423/242 R |
| 1280165 | 10/1928 | United Kingdom | 423/210 |

OTHER PUBLICATIONS

Baglio et al., "Lanthanum Oxide-Based Catalysts for the Claus Process", Ind. Eng. Chem. Prod. Res. Dev. 1982, 21, pp. 408–415.

Grant, Julius, "Hackh's Chemical Dictionary", 4th Ed., pp. 701–702 (McGraw-Hill Book Comp.).

Primary Examiner—Robert L. Stoll
Assistant Examiner—Robert M. Kunemund
Attorney, Agent, or Firm—Ralf H. Siegemund

[57] ABSTRACT

COS, $CS_2$, mercaptan, $SH_2$, SOX and/or NOX are removed from a host gas by scrubbing using a solution of a salt of Scandium, Yttrium, an element of the Lanthanide or Actinium groups or blends thereof in water or in organic solvent.

15 Claims, No Drawings

DECONTAMINATION OF GASES BY SCRUBBING

BACKGROUND OF THE INVENTION

The present invention relates to the removal of organic sulfur compounds such as carbonoxysulfide (COS), carbon sulfide ($CS_2$), and mercaptans, possibly in addition to hydrogen sulfide, from gasses herein called host gases which contain these compounds, and using scrubbing of the host gas at normal or elevated pressure and at temperatures in the range between 20 and 200 degrees centigrade under utilization of a particular scrubbing solution. The invention relates particularly to such a solution. The method is to be applicable to any kind of gasses which may contain these compounds as contaminants. Examples for host gasses are, for example, natural gas, coke gas, water gas, generator gas, and gasses originating in carbon gasification equipment but also to all kinds of exhaust fumes that may contain any of these compounds.

From a somewhat different point of view, the invention relates to a method for the removal of sulfur oxides (SOX) and/or nitrogen oxides (NOX) from host gasses under utilization of reducing compounds using also scrubbing of the host gas at a normal or elevated pressure at a temperature between 20 and 200 degree centigrade, using for scrubbing also a solution. Examples for the host gas which may contain SOX and/or NOX are smog, smoke, fume, exhaust gasses, resulting, for example, from sulfuric acid nitrogen acid production, roasting gasses or the like.

Generally speaking, it is known to remove organically bound sulfur from a host gas under utilization of an alkali medium such as a watery solution of carbonates, bicarbonates, borate, phosphate, of alkali metal, or under utilization of solutions containing organic alkyl amines, aryl amines, and alkanolamines. Any $CO_2$ contained in the host gas is also absorbed, but that amounts to an additional and unnecessary expenditure.

The removal of carbon-oxy-sulfide COS and $CS_2$ by means of the presently used scrubbing process, particularly for removal of the acidic contaminants H2S and CO2, is insufficient. A variety of proposals have been made to solve this problem to be briefly described as follows. Among the known methods for the removal of organically bound sulfur, the most successful procedure involves the heterogenic, catalytic conversion of the contaminant into hydrogen sulfide. As a catalyst, one uses here heavy metals such as iron, lead, molybdenum, nickel, tungsten, and preferably the sulfides of these metals. Also, CO converting catalysts, direct or in modified form, are used. However, all these heterogenic, catalytic methods even when in any variety are disadvantaged by the fact that one has to use high temperatures such as at least 300, up to 600 degrees centigrade.

Therefore, it has been suggested in the alternative to treat gasses at such high temperatures with basic reacting salts of unorganic or organic bases, solved in water or alcohol so that the contaminants, such as COS and CS2, are changed by means of hydrolysis into hydrogen-sulfide which, in turn, can be removed together with the host gas from the reaction zone. The problem here, however, is that the requisite basicity of the scrubbing medium has to be maintained in spite of the presence of H2S and CO2. These compounds are to be converted into sulfides and carbonates or bi-sulfides and bi-carbonates and, therefore, reduce the basicity of the material as a whole. The hydrogen-sulfide that is present as well as it forms catalytically will then have to be removed from the gas in a separate step.

Other methods for removal of sulfur-oxyde and/or nitrogen-oxyde from smog and smoke fumes are known such as a catalytic as well as non-catalytic oxidation of SO2 and NOX under utilization of oxygen, ozone or the like. Herein then takes place a catalytic as well as a non-catalytic reduction of these contaminants under formation of ammonia followed by wet absorption of the acidic contaminants SOX and NOX through a watery solution or a suspension. In case any temperature variation is observed, as well as in case of non-stoichiometric composition of the redox system difficulties will be encountered, such as the emission of one of the reaction participants. Therefore, one has used catalysts as a reaction aid which will operate in an optimum temperature range from 350 to 450 degrees centigrade. Generally speaking the combustion requires pyrotechnical steps to be taken, and will reduce the NOX emission values only to a minimum extent. Also, they require a rather difficult realizable change in the combustion process, which in the case of refurnishing existing equipment, may entail large expenditures.

In Japan redox reactions are already used for removing SO2 and NOX. These methods are disadvantaged by the fact that they use up large quantities of rather valuable products such as hydrogen peroxide is used as an oxidizer, or ammonnia if used as a reduction medium. Moreover, the danger exists in catalytic reduction and in case of reaction vessels being heated by coal that the catalysts maybe rendered ineffective by the dust. On the other hand wet precipitation has the advantage that not only will NOX and SOX be removed but the precipitation of dust and removal is a fortunate side effect.

DESCRIPTION OF THE INVENTION

It is an object of the present invention to provide a new and improved simple method for removing organic sulfur compounds including mercaptan, possibly in addition to hydrogen sulfide, and to provide particularly for removal of SOX and NOX from host gasses. It is a feature of the invention that the advantages of gas scrubbing be retained, without requiring any reheating of the cleaned and scrubbed gas. Moreover, the method should require only those kinds of chemicals which are easily available and can be regenerated.

In accordance with the preferred embodiment of the invention COS, carbon disulfide, possibly also hydrogen sulfide, mercaptan (thiols), SOX and NOX from host gasses under utilization of scrubbing in that a scrubbing solution is used which includes the salts of the following materials: scandium, yttrium, an element of the lanthanides, an element of the actinides or blends thereof, using water or organic compounds as solvents. The lanthanide group (III B) includes La, Ce, Pr, Nd, Pm, Sm, Eu, Gd, Tb, Dy, Ho, Er, Tm, Yb, and Lu. The actinium series or actinide group includes Ac, Th, Pa, and U. The salts of these elements that are usable are all those which can either be solved in an organic solvent or in water or both. Examples here are chlorides, sulfides, bromides, nitrates of these elements and others. It was surprisingly that alkandionates as a salt are usable as solvents if they exhibit the following structure.

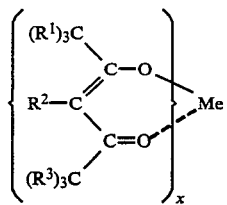

Herein Me is either scandinum, yttrium, an element of the lanthanum group or the lanthanide series or of the actinide group, preferably La, Ce, Pr, Yb, and Th.

X can be 3 or 4, $R^1$, $R^2$, and $R^3$ can be similar or different but in either case are constituted by a hydrogen atom and an alkyl or an alkanyl or an aryl group whereby however, every member of these groups can be substituted by one or several halogen atoms (group VII A). The alkyl group member can be a straight chain or branched, and will contain preferably from 1 to 10, preferably 1-5, or, better even, 1-3 carbon atoms. Examples here are the chelates of acetylacetons and formylacetons.

The alkanyl group may contain from 2-10 carbon atoms. Examples here are the chelates of the 1-propane-1, 3butandions, 1-butene-1, 3-butandions.

The aryl group is preferably a phenyl remainder, examples here are the chelates of benzoylacetones and dibenzoylacetones.

The aforementioned groups may be substituted by halôgen atoms such as chlorine or fluoride to form, for example, 1, 1, 1, 2, 2, 3, 3-heptaflouriden.

The chelate complexes will be added as such to the scrubbing medium, and, for example, lanthanum (III)-2, 2, 6, 6-tetramethyl-3,5-heptandionate (La(thd3), praseodym (III)-2,2,6,6-tetramethyl-3,5-heptandionat (Pr(thd)3), ytterbium (III)-7,7-dimethyl-1,1,1,2,2,3,3-heptafluoro-4,6-octandionat (Yb(fod)3), or blends thereof. Suitable complexes may even form during the scrubbing process in the scrubbing medium, by way of reacting with alkandions for example, pentan-2,4-dion(CH3COCH2COCH3)1-phenyl-1,3-butan-dion(C6H5COCH2COCH3) of solvent salts of a member of the lanthanide and of the actinides series, for example, of LaCl3, La(NO3)3.6H2OLa2(SO4)3, Ce(-NO3)3.6H20, Th(NO3)4.6H20, Th(C204)2.6H20 etc.

The effectiveness of the inventive chelate complex containing scrubbing medium can be enhanced by adding salts of alkali metal, preferably carbonates or thiocarbonates. Examples here, particularly for the alkali metal are lithium, sodium, and potassium. The salts of the thiocarbonacid are preferably salts of dithiocarbon acid, such as potassium-O-ehtyldithiocarbonate (C3H5KOS2).

The inventive method uses organic solvents, possibly containing water. The concentration of water depends on the soluability of water in the high boiling organic solvent. One has to have an amount of water that is at least sufficient for obtaining hydrolysis. The solutions cover a large range of water content and may contain from 0.1 to 98% of water in relation to the water/organic solvent blend. Preferred is a content from 1-5% by weight at normal atmospheric pressure and from 5-15% by weight when the method is practiced at elevated pressure. For the removal of COS, mercaptans etc. solutions may be completely watery.

In the case of organic solvents, high boiling point organic materials are to be used. Examples here are glycole, polyglycole, polyglycolalcylether, polyglycolarylether, phosphoric acid ester, and ester of dicarbonic acid, such as phthalic acid ester, adipin acid ester, alkanolamine or alkylalcanolamine or blends thereof. Preferred are organic solvents such as polyglycole and polyglycolether.

The salts of the scandium, yttrium, of an element of the lanthanide group or an element of the actinide group or a blend thereof, preferably their chelate complexes, may be added up to saturation, either to the scrubbing water or to the scrubbing organic solvent. Preferably, one uses with a thin i.e. watery solution having a concentration between 0.1 and 5% by weight with reference to the scrubbing solution. The salts of alkali metals can likewise be added up to saturation, preferably, however, one uses from 0.1 to 5% by weight alkali metal salt, the percentage being also taken with reference to the scrubbing solution.

In accordance with a particularly preferred embodiment of the invention, one uses from 0.1 to 5% by weight solvents of the lanthanum and/or actinium complex and/or a complex of scandium and yttrium and/or 0.1 to 5% by weight solutions of alkali carbonates or alkalithiocarbonates. In this preferred form of practicing the invention, the solvent is water or a blend of water and polyglycol ether.

The inventive method preferably operates in a temperature range from 20 to 200 degrees centigrade, with 80 to 130 degrees centigrade being the preferred range. It was surprising and clearly unobvious that the removal of contaminants in scrubbing process can be practiced in accordance with the invention even at room temperature. As stated, the inventive method can be practiced at normal atmospheric pressure or at an elevated pressure. The pressure generally can be within the range from 1 to 200 bars, preferably one uses from 1 to 70 bars.

In accordance with a further feature and aspect of the invention, the scrubbing solution can be regenerated in a simple manner which is generally known to those working in the art and may include stripping with an inert gas or stripping under development of vapor or evacuation. By way of example, the scrubbing liquid for purposes of regeneration will be heated up to 160 degree at about 5 bar pressure.

The inventive method can be practiced with all devices as they are normally used for the scrubbing of contaminated gas and that includes the usual utilization of pumps, valves, scrubbing columns, desorption devices, and so forth.

In practicing the invention for removing SOX and/or NOX one uses additional reducing compounds in the scrubbing process. Examples for the reducing compounds are sulfur compounds such as hydrogen sulfide, carbon sulfide, COS, mercaptans and blends thereof, and/or carbon-oxygen compounds, such as formaldehyde, methanol, formic acid, and formic acid ester or blends thereof. These reducing mediums will be added to the reaction solution and the following reactions obtain in accordance with their equations:

$$So2 + CS2 \rightarrow Co2 + 3S \qquad (1)$$

$$SO2 + COS \rightarrow 2\ CO2 + 3S \qquad (2)$$

$$SO2 + 2\ H2S \rightarrow 2\ H2O + 3S \qquad (3)$$

$$SO2 + 2\ HCOOH \rightarrow 2\ CO2 + 2\ H2O + S \qquad (4)$$

$$2NO + CS_2 \rightarrow CO_2 + N_2 + 2S \quad (5)$$

$$NO + COS \rightarrow CO_2 + \tfrac{1}{2}N_2 + S \quad (6)$$

$$NO + H_2S \rightarrow H_2O + \tfrac{1}{2}N_2 + S \quad (7)$$

$$NO + HCOOH \rightarrow CO_2 + H_2O + \tfrac{1}{2}N_2 \quad (8)$$

whereby in each instance, the reactant produced sulfur is produced in the liquid phase. Generally, if one uses reducing sulfur compounds under inclusion of higher oxydes, the following more generalized equations obtain.

$$SO_x + x\,S_2 \rightarrow (x+1)\,S + x\,O_2^- \quad (9)$$

$$NO_x + x\,S_2 \rightarrow xSD + \tfrac{1}{2}N_2 + x\,O_2^- \quad (10)$$

German printed patent applications No. 19 10 127 and 21 58 072 describe a method for changing hydrogen sulfide and sulfurdioxide into elemental sulfur in the presence of a catalyst. This catalyst is a salt of a metal of the group I-A or II-A of the periodic table, and in addition, includes an organic polycarbon acid, of which at least one acid function is estered with a compound R—OH.

It was found that the contact media in accordance with these two publications remain active longer, and do not only produce reactions of hydrogen sulfide with sulfur oxide but also reactions of carbon sulfide and/or carbon oxi-sulfide with sulfur oxide in catalytic reaction, if one adds the salts of the elements scandium, yttrium, of lanthanide series, and/or of the actinide series.

In this case of practicing the invention it is not necessary to have alkali metal or alkaline earth metal present in the form of a salt of partially estered polycarbon acids. Rather, it was found that the salts of the metal of the groups I-A and II-A, and of the monocarbon acids, such as carbonate or thiocarbonate in watery and/or organic solutions will not interfere with the effect of the complexes of scandium, yttrium, of a lanthanide group element and of an actinide group element. Rather in cooperation with these complexes, there will be a catalytic reaction between the hydrogen sulfide, sulfur dioxyde as well as reactions between carbon sulfide and/or or carbon oxy sulfide with one of sulfuroxides (SOX). It is remarkable is this case that for a temperature range between 60 and 114 degrees centigrade one obtains sulfur chrystals which can be filtered out with ease. The presence of ammonia furthers the redox reaction as well as the hydrolysis reaction.

As far as cleaning and scrubbing gasses containing NOX, it is known that the absorptivity or absorbing power of watery solutions as far as nitrogen monoxide is concerned, can be improved if one adds to the watery solution an iron II-EDTA complex such as described in Heiting, B., Fortschr.Ber. VDI-Z, Line 3, No. 75. It was found that the adding of salts of scandium, of an element of the lanthanide group, and/or an element of the actinides group to a high boiling organic liquid, such as polyglycole or polyglycole ether, containing already salts of a transition metal, such as chromium, iron, cobalt, nickel, ruthenium, possibly also alkali and earth alkali metals, the reaction and degree of reaction in accordance with the reaction equations on page 11 can be increased considerably.

The temperature range in which a watery and/or an organic salt solution of a chelate of the scandium, yttrium, of an element of the lanthanides or actinides, and carbonates or thiocarbonates of the alkali and alkaline earth metals, possibly also of an organic and unorganic compounds of the transition metal, can be used is very large and is, for example, between 20 and 160 degrees centigrade. If one wants to have the elemental sulfur in liquid form in accordance with the reaction equations of page above, one will preferably use a temperature in the range between 120 and 130 degrees centigrade. Thus, one will work just a little above the natural melting point of sulfur.

The salts of the elements of the scandium, yttrium, an element of the lanthanide and actinide groups, of an alkali and of an alkaline earth metals, as well as of the transition elements can be added to the water or to the organic solvent up to saturation. Preferably, however, and still in accordance with the invention, solutions with a salt concentration of 0.1 to 5% by weight are sufficient. The water content in the organic liquid solution depends on the temperature and can possibly be controlled through pressure control.

The compound serving as reducing agent such as hydrogen sulfide, sulfur carbonate, COS, mercaptan, formic acid, formaldehyde, methanol and/or formic acid ester can be added to the contact media prior to the scrubbing process. This is possible if the solvent for the catalytically acting salts are highly soluble, as far as the particular reduction medium is concerned. For example, the soluability of carbon disulfide in polyethylenoglycol 400 at room temperature and at a 10% by weight concentration as compared with hydrogen sulfide at a partial pressure of 1 bar and a temperature of 25 degree centigrades, in tetraethyleneglycoldimethylether at 22 Ncm$^3$/g and of carbonoxysulfide with a partial pressure of 1 bar and a temperature of 100 degrees centigrade, is still 2.65 Ncm$^3$/g. Owing to the high absorption capability of the contact media as far as the reduction medium is concerned, preloading is preferably arranged such that during scrubbing stoichiometric conditions are present.

Another possibility of adding the reduction medium into the process is to be seen in stoichiometrically adding it to the host gas flow.

Basically then it is possible to remove sulfur compounds under utilization of catalysts in accordance with the inventive method just by adding SOX and/or NOX so as to remove carbon disulfide, COS, CS$_2$ and mercaptan.

The scrubbing device for practicing the invention can, as stated, be of any kind of suitable configuration.

EXAMPLES FOR REMOVING COS, SC$_2$, MERCAPTAN, POSSIBLY H$_2$S

EXAMPLE 1

A 300 ml flask with bottom frit (porosity of the frit Por=O; average gas bubble diameter=2 mm) is heated to 80 degrees C and filled with 200 ml watery reaction medium. Subsequently, a gas flow that has been moistened at 80 degrees C and that includes COS and CS$_2$ as contaminants, is dispersed at a rate of 100 ml/min above the frit in the reaction medium. The dwell or residence time of the bubbles in the reaction medium is about 2 seconds. Under these conditions, and depending upon the composition of the reaction medium the following results were obtained:

TABLE 1

| GAS Nitrogen | — | + 1% KOH | + 0.5% C₃H₅KOS₂ | + 0.25% Pr(thd)₃ | + 0.5% Yb(fod)₃ |
|---|---|---|---|---|---|
| Content on charge (Vol.-ppm) | | | | | |
| COS | 1000 | 50000 | 7000 | 17000 | 7000 |
| CS₂ | 2500 | 8000 | 700 | 700 | 10000 |
| Content on discharge (Vol.-ppm) | | | | | |
| COS | 830 | 32150 | 2793 | 5338 | 2000 |
| CS₂ | 2500 | 6296 | 253 | 312 | 4300 |
| Net change (%) | | | | | |
| COS | 17 | 35.7 | 60.1 | 68.6 | 71.4 |
| CS₂ | 0 | 21.3 | 63.9 | 55.4 | 57.0 |

EXAMPLE 2

A similar 300 ml container but with a frit porosity of Por =2 and the same gas bubble diameter of 1 mm is filled with 200 ml watery solution of a reaction medium, and maintained boiling for 40 hours with return path cooling. After cooling to room temperature the solution is evacuated and heated to 100 degrees C while maintaining a pressure of 1.5 bars. A nitrogen gas flow (host gas) at the rate of 150 ml/min with a CS₂ content of 22500 vol.ppm is disperged above the frit in the reaction medium. The rise time of the gas bubbles in the liquid column is about 1 sec. and the following results were obtained:

TABLE II

| HOST GAS Nitrogen | SCRUBBING SOLUTION (WATER) | | |
|---|---|---|---|
| | Water + 10% by weight acetylacetone + 1% by weight K₂CO₃ + 10% by weight La(NO₃)₃.6H₂O | Water + 10% by weight acetylacetone + 1% by weight C₃H₅KOS₂ + 10% by weight La(NO₃)₃.6H₂O | Water + 10% by weight acetylacetone + 1% by weight C₃H₅KOS₂ + 10% by weight Th(NO₃)₄.5H₂O |
| CS₂ content on discharge (Vol.-ppm) | 4680 | 1777 | 743 |
| Reaction % | 79.2 | 92.1 | 96.7 |
| pH value of reaction medium: | | | |
| START: | 5.5 | 4.5 | 3.0 |
| END: | 4.4 | 3.5 | 2.5 |

EXAMPLE 3

A 300 ml flask of the type mentioned above but with a frit porosity of Por =2, and a median gas bubble diameter of 1 mm is filled with 200 ml watery reaction medium and boiled for 40 hours under cooling of the return flow. After cooling to room temperature the solution was evacuated and heated to 100 degree C under a pressure of 1.5 bars. A flow of nitrogen at the rate of 150 ml/min with a carbon sulfide content of 22500 vol.ppm was disperged above the frit into the reaction medium. The ise time of the gas bubbles in the liquid column was about 1 sec. This procedure yielded the following results.

TABLE III

| HOST GAS Nitrogen | SCRUBBING SOLUTION (WATER) | | |
|---|---|---|---|
| | Water + 10% by weight acetylacetone + 1% by weight K₂CO₃ + 10% by weight La(NO₃)₃.6H₂O + 2.5% by weight diethylaminoethanol | Water + 10% by weight acetylacetone + 1% by weight C₃H₅KOS₂ + 10% by weight La(NO₃)₃.6H₂O + 2.5% by weight Diethyanolmethylamine | Water + 10% by weight acetylacetone + 1% by weight C₃H₅KOS₂ + 10% by weight Th(NO₃)₄.5H₂O + 2.5% by weight Triethanolamine |
| CS₂ content on discharge (Vol.-ppm) | 3105 | 405 | 0 |
| Reaction % | 86.2 | 98.2 | 100 |
| pH value of reaction medium: | 7 | 5.0 | 4.0 |

EXAMPLE 4

A 300 ml container with a frit porosity of Por=O and a medium gas bubble diameter of 2 mm was heated to 85 degrees C and filled with 200 ml reaction medium. Subsequently, the nitrogen wetted at 80 degrees C and containing carbon disulfide at a flow rate of 100 ml/min was disperged above the frit into the reaction medium. The dwell or residence time of the gas bubbles in the reaction medium amounted to about 2 sec. Under these conditions, the following results obtain, depending on the composition of the reaction medium.

TABLE 4

| GAS Nitrogen | REACTION MEDIUM | | | |
|---|---|---|---|---|
| | Diethyl- aminoethanol 10% by weight $H_2O$ | Diethyl- aminoethanol 10% by weight $H_2O$ 0.25% by weight $Pr(thd)_3$ | Triethanolamine 10% by weight $H_2O$ | Triethanolamine 10% by weight $H_2O$ 0.25% by weight $Pr(thd)_3$ |
| $CS_2$ content on charge (Vol.-ppm) | 25000 | 25000 | 15000 | 15000 |
| $CS_2$ content on discharge (Vol.-ppm) | 4275 | 1350 | 2055 | 495 |
| Net change (%) | 82.9 | 94.6 | 86.3 | 96.7 |

EXAMPLE 5

10 glass, frit containing bottles were used, each having a volume of 250 ml, and the frit has a porosity of 1, the medium gas bubble diameter is 2 mm. All bottles are connected in series and filled with 150 ml reaction medium. While maintaining a pressure of 2 bars, the temperature of the solution was maintained constant within the range of 80 to 120 degrees C. The nitrogen flow to be dispersed was wetted at 80 degrees C., and the contaminant was added. The dwell or residence time of the gas bubbles in the reaction medium was about 10 sec., the flow being between 75 and 200 ml/min, and the dwell or residence time was the sum total in each of the 10 liquid columns. The results for different gas compositions and different reaction media as obtained and combined in Table 5.

TABLE 5

RELATIVE CHANGE (%) FOR DIFFERENT CONCENTRATIONS OF CONTAMINANTS IN A CHARGE FLOW, (in Vol.-ppm)

| Test conditions and consistency of reaction medium | | |
|---|---|---|
| (1) | Temp. = 80 degrees C.; $V_{gas}$ = 75 ml/min, Water, 3% by weight $La(NO_3)_3.6H_2O$, 0.2% by weight $C_3H_5KOS_2$, 3% by weight Acetylacetone. | | |
| (2) | Temp. = 80 degrees C.; $V_{gas}$ = 150 ml/min, Triethylenglycoldimethylether, 33% by weight Water, 1% by weight $LaCl_3$, 0.1% by weight $C_3H_5KOS_2$, 1% by weight Acetylacetone. | | |
| (3a) | Temp. = 90 degrees C.; $V_{gas}$ = 200 ml/min, Polyethylenglycol 400, 1% by weight Water. | | |
| (3b) | Polyethylenglycol 400, 1% by weight Water, 1% by weight KOH. | | |
| (3c) | Polyethylenglycol 400, 1% by weight Water, 1% by weight $K_2CO_3$. | | |
| (3d) | Polyethylenglycol 400, 1% by weight Water, 1% by weight $K_2CO_3$, 0.5% by weight $Ce(NO_3)_3.6H_2O$, 5% by weight Acetylacetone. | | |
| (3e) | Polyethylenglycol 400, 1% by weight Water, 0.5% by weight $C_3H_5KOS_2$, 0.25% by weight $La(thd)_3$. | | |

| Concentration on charge C (Vo.-ppm) Reaction change (%) R | | |
|---|---|---|
| COS | $CS_2$ | $H_2S$ |
| (1) C: 268 | C: 1200 | C: 1500 |
| (1) R: 73.5 | R: 56.5 | R: 30.4 |
| (2) C: 350 | C: 1500 | C: 3500 |
| (2) R: 88.9 | R: 74.2 | R: 100 |
| (3a) C: 80 | C: 6000 | C: 10000 |
| (3a) R: 11 | R: 0 | R: 0 |

TABLE 5-continued

RELATIVE CHANGE (%) FOR DIFFERENT CONCENTRATIONS OF CONTAMINANTS IN A CHARGE FLOW, (in Vol.-ppm)

| (3b) | R: 37 | R: 60 | |
|---|---|---|---|
| (3c) | R: 39 | R: 77 | |
| (3d) | R: 94 | R: 97 | R: 100 |
| (3e) | R: 100 | R: 99.7 | R: 100 |

EXAMPLE 6

A stream of nitrogen saturated with water vapor at 60 degrees C., having a content of sulfur containing impurities as follows:

| $H_2S$ | 2 vol. % |
|---|---|
| COS | 3 g/m$^3$ |
| $CH_3SH$ | 1 g/m$^3$ |

This gas was treated with a solution of tetraethylenglycoldimethyl-ether, which contained 0.5% by weight praseodym(III)-2,2,6,6-tetramethyl-3,5-heptandionate, at a rate of 10 l solution per Nm$^3$ gas. The chemical reaction within the gas to be purified was carried out in a scrubbing tower filled with the so called Raschigrings. The scrubbing solution was moved in counter flow relation, i.e. from top to bottom, thus opposing the upflow of gas in the tower. For an operating temperature in the scrubber of 80 degrees C., the residence time of the gas in the pile filling was about 40 sec. The scrubbed gas is extracted from the top of the tower.

In a parallel test conducted under similar conditions, the scrubbing medium contained additionally 0.5% by weight potassium-O-ethyldithiocarbonate. The following table 6 is informative in the results.

TABLE 6

| | $H_2S$ (vol. %) | COS + $CH_3SH$ (g/m$^3$) |
|---|---|---|
| Concentration of the Contamination at the Entrance | 2 | 4 |
| Composition of the Scrubbing Medium: | | |
| 0.5% by weight $Pr(thd)_3$ tetraethyleneglycoldimethylether | | |
| Concentration of the Contaminant on Discharge | 0.114 | 0.508 |
| Scrubbing (%) | 94.3 | 87.3 |
| Composition of the Scrubbing Medium: | | |
| 0.5% by weight $Pr(thd)_3$ 0.5% by weight $C_3H_5KOS_2$ in Tetraethyleneglycoldimethylether | | |
| Concentration of the Contaminant on Discharge | 0.028 | 0.184 |
| Scrubbing (%) | 98.6 | 95.4 |

The results of Examples 1 through 6 demonstrate that it is possible by means of the inventive method to scrub a host gas in a satisfactory manner for the removal of organic sulfur compounds in addition to hydrogen sulfide and to thereby purfying and clean the particular gas in a single step process.

EXAMPLES FOR THE REMOVAL OF SOX AND NOX

EXAMPLE 7

A 300 ml glass, frit containing flask or container with a porosity of the frit =2 and a medium gas bubble diameter of 1 mm is heated to 80 degrees C and filled with a 200 ml watery reaction medium. Subsequently, a nitrogen stream having been wetted at 80 degrees C. and containing the SOX and NOX contaminants is dispersed above the frit into the reaction medium at a flow rate of 100 ml/min. The dwell or residence time of the bubbles in the reaction medium is about 1 sec. Under these conditions the following results obtain depending upon the composition of the reaction medium.

TABLE 7

| Composition of the reaction medium and reaction obtained. | | Charge concentration (Vol.-ppm) | | | | Discharge concentration (Vol.-ppm) Net change (%) | | | |
|---|---|---|---|---|---|---|---|---|---|
| | | $CS_2$ | COS | $H_2S$ | $SO_2$ | $CS_2$ | COS | $H_2S$ | $SO_2$ |
| Solution of 0.25% by weight $La(thd)_3$ in $H_2O$ | (a) | 820 | 7690 | — | 3248 | 340 58.5 | 3170 58.8 | — — | 0 100 |
| Suspension of 0.65% by weight $La_2O_3$ and 0.73% by weight cyclohexandiamine-(1.2)-tetra-acetic acid in water | (b) | 556 | 6872 | — | 3062 | 257 53.8 | 972 95.8 | 970 — | 0 100 |
| Solution of 0.5% by weight potassium-O—ethyl-thiocarbonate in $H_2O$ | (c) | 998 | 7550 | — | 4020 | 990 0.8 | 6493 14.0 | — — | 3490 13 |
| Solution of 0.5% by weight $Yb(fod)_3$ and 0.25% by weight potassium-O—ethyl-dithiocarbonate in $H_2O$ | (d) | — | 409 | 1328 | 1732 | — | 20 95.1 | 0 100 | 0 100 |
| Solution of 5% by weight $Th(NO_3)_4 \cdot 6H_2O$, 0.5% by weight potassium-O—ethyl-dithiocarbonate and 15% by weight acetylacetone in $H_2O$ | (e) | 5683 | — | — | 5000 | 0 100 | — | — | 0 100 |

EXAMPLE 8

A nitrogen flow and stream saturated with water vapor at 80 degrees C. was loaded with contaminants as well as gaseous oxidation and reduction compounds. Subsequently, this flow was fed to a scrubbing tower filled with Raschigrings and treated in counter flow method with the scrubbing solution at the amount of 10 l solution pro $Nm^3$ gas. The selected operating temperature for scrubbing was 80 degrees C, and the residence time of the gas in the filling pile was 40 sec. The purified and scrubbed gas was extracted from the head of the scrubbing tower. The scrubbing solution is catalytically effective in a homogeneous phase and was composed as follows:

Scrubbing Solution 1:
67 parts pentaethylenglycolmethylisopropylether, 33 parts water; 0.7 parts $La(NO_3)_3 \cdot 6H_2O$; 0.1 part $C_3H_5KOS_2$; 2.2 parts acetylacetone.

Scrubbing Solution 2:
In a parallel test, being otherwise the same but using a different solution, the scrubbing solution 2 had the following composition:
67 parts pentaethylenglycolmethylisopropylether, 33 parts water; 0.4 parts $FeSO_4 \cdot 7H_2O$; 0.56 part disodium salt of ethylendiamintetra acetic acid.

Scrubbing Solution 3:
In still a further parallel test, using scrubbing solution 3, which included all the components of solution 1 above, but in addition the following:
0.4 part $FeSO_4 \cdot 7H_2O$ and 0.56 part of disodium salt of ethylendiamintetra acetic acid.

Depending upon the composition of the host gas and the gas to be treated generally, as well as depending upon the type of the scrubbing solution, the following results obtained as set forth in Table 8.

TABLE 8

| CONCENTRATION OF GAS COMPONENTS | | | | | | | | | | |
|---|---|---|---|---|---|---|---|---|---|---|
| On charge (Vol.-ppm) | | | | | On discharge (Vol.-ppm) Net change (%) | | | | | |
| COS | $CS_2$ | $H_2S$ | $SO_2$ | NO | COS | $CS_2$ | $H_2S$ | $SO_2$ | NO | |
| SCRUBBING SOLUTION 1 | | | | | | | | | | |
| 100 | — | 3300 | 1500 | — | 16 84 | — — | 385 88.3 | 0 100 | — — | |
| 70 | 100 | 3800 | 2000 | — | 9 87.1 | 0 100 | 20 99.5 | 0 100 | — — | |
| 70 | 1000 | 2400 | 1800 | 1000 | 12 | 66 | 0 | 102 | 148 | |

TABLE 8-continued

CONCENTRATION OF GAS COMPONENTS

| On charge (Vol.-ppm) | | | | | On discharge (Vol.-ppm) Net change (%) | | | | |
|---|---|---|---|---|---|---|---|---|---|
| COS | CS₂ | H₂S | SO₂ | NO | COS | CS₂ | H₂S | SO₂ | NO |
| | | | | | | | 82.8 | 93.4 | 100 | 94.3 | 85.2 |
| SCRUBBING SOLUTION 2 | | | | | | | | | |
| — | — | 2400 | 1800 | 1000 | — | — | 1500 | 1188 | 726 |
| | | | | | | | 37.5 | 34.0 | 27.4 |
| SCRUBBING SOLUTION 3 | | | | | | | | | |
| 70 | 1000 | 2000 | 1800 | 1000 | 6 | 77 | 10 | 300 | 87 |
| | | | | | 91.4 | 92.3 | 99.5 | 83.3 | 91.3 |

EXAMPLE 9

In a flow of nitrogen also saturated at 80 degree C with water vapor and containing the following contaminants:

| | |
|---|---|
| SO₂ | 2000 vol.-ppm. |
| NO | 1000 vol.-ppm. | and a reduction component H2S of 5000 vol.ppm. was treated with a 10% by weight solution of tricyclodecandimethylalcohol in polyethyleneglycol 400, containing also 1% by weight Pr(thd)₃, 2% by weight lithiumcarbonate and 1% by weight iron (II)-ethylenediamintetraacetic acid complex salt. The amount used was characterized by 15 1 solution per Nm3 gas. The operating temperature was 125 degrees C and the scrubbing tower contained Raschig-rings. The dwell and residence time of the gas in the filling pile was about 35 sec. The water content of the scrubbing medium was adjusted to 10% by weight for a pressure that was maintained at 2.5 bars. The scrubbed gas was extracted from the head of the scrubbing tower while elementary sulfur that percipitated from the scrubbing liquid, but as a liquid and formed a lump at the bottom, and was extracted therefrom. The following table demonstrates the result.

TABLE 9

| | SO₂ (Vol.-ppm) | NO (Vol.-ppm) |
|---|---|---|
| Charge Gas | 2000 | 1000 |
| Discharge Gas | 32 | 0 |
| Degree of Scrubbing (%) | 98.4 | 100 |

EXAMPLE 10

A blend of formic acid water was heated to 86 degrees C in azeotropic mixture. A flow of nitrogen was run through this mixture, containing contaminants such as SO₂ of about 2000 vol.-ppm. and NO of about 500 vol.-ppm. In addition the solution of 1% by weight lanthanumnitratehexahydrate, 3% by weight acetylacetone, 1% by weight lithiumpropionate and 0.5% by weight chromium(III)-acetate in pentaethyleneglycolmethylisopropylether in the amount of 15 l solution per Nm3 gas. The operarting temperature was selected to be 130 degree C and a scrubbing tower filled with raschig-rings was used to obtain a residence and dwell time of the gas of about 30 sec. The water content of the liquid phase became about 1.5% by weight. The scrubbed gas was again extracted from the top of the scrubbing tower, while a sump developed in the bottom resulting again from elemental sulfur that precipitated in liquid form from the scrubbing fluid. Table 10 shows the results.

TABLE 10

| | HCO₂H | SO2 | NO | H₂S | CO₂ |
|---|---|---|---|---|---|
| Charge gas | 4500 | 2000 | 500 | 0 | 0 |
| Discharge gas (Vol.-ppm) | 0 | 140 | 99 | 372 | 4480 |
| Reaction (%) | 100 | 93 | 80.2 | — | — |

The invention is not limited to the embodiments described above, but all changes and modifications thereof, not constituting departures from the spirit and scope of the invention, are intended to be included.

I claim:

1. A method for removing of at least one of the following contaminants, COS, CS2, mercaptans, SOX and/or NOX from host gases, including the step of scrubbing the contaminant containing host gases at a normal or elevated pressure, at a temperature between about room temperature and 200 degrees Celsius, the improvement comprising, using in the step of scrubbing a solution of salts of at least one element of the following, scandium, yttrium, lanthanide or actinide groups, or mixtures thereof of such salts, the solution being in water and/or an organic solvent, to remore sulfur and/or nitrogen.

2. Method as in claim 1 wherein the salt is characterized by the following structure:

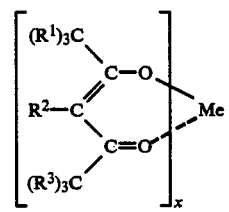

wherein Me is scandium, yttrium, an element of the lanthanide group or of the act enide group, X is 3 or 4, R¹, R², and R³ are similar or different, and selected from a hydrogen atom, and alkyl, an alkenyl, or an aryl group, with selective substitution of these groups by one or more halogene atoms.

3. A method as in claim 1 wherein said salts are solved in a solution that contains diketone.

4. A method as in claim 1, including in addition a step of using for scrubbing additionally a mixture of salts of alkali metal.

5. A method as in claim 4 wherein said alkali metal salts are carbonate and/or thiocarbonate.

6. A method as in claim 1 wherein the organic solvent has a high boiling point.

7. A method as in claim 6, said organic solvent being selected from the following: glycole, polyglycole, polyglycolalcylether, polyglycolarylether, phosphoric acid ester, ester of dicarbonate acid, phthalic acid ester, adipin acid ester, alkanolamine or alkylalcanolamine or blends thereof.

8. A method as in claim 1, including the step of using alkandionates of Scandium, or Yttrium or an element of the Lanthanide or the Actinide group, individually or in a mixture of
    alkandionates and in a solution under further utilization of a chloride, a nitrite or a sulfide
    respectively of Scandium or Yttrium or an element of the lanthanide group or an element of the actinide group or a blend thereof.

9. A method as in claim 1, using a solution from 0.1 to 5% by weight of a lanthanide and/or actinide complex and/or a complex of scandium and yttrium with 0.1 to 5% by weight solutions of alkalicarbonate or alkalithiocarbonate.

10. A method as in claim 1 wherein said solution for scrubbing is regenerated by maintaining a pressure within the range from 5-50 bars at temperatures in excess of 150 degrees Celsius, following which the medium is decompressed.

11. A method as in claim 1 for the removal of SOX or NOX, including the step of using in addition a reducing compound in said solution, also including a sulfur compound selected from the group comprising hydrogen sulfide, carbon disulfide, carbonoxysulfide, mercaptan or a blend of carbon-oxygen-com ponents including, formaldehyde, methanol, formic acid or ester of formic acid or mixtures thereof.

12. A method as in claim 1 for the reduction of SOX and/or NOX further adding a catalyst to obtain a reaction on contact with the gase to be scrubbed.

13. A method as in claim 1 for the removal of NOX and SOX, further adding a catalyst in said solution, the method being carried out in the still further presence in the solution of a reducing compound at temperatures from 20 degrees Celsius to 180 degrees Celsius at the state of pressure.

14. A method as in claim 13 for the removal of NOX and SOX, including the step of adding water vapor to the gas to be scrubbed, in a quantity sufficient for obtaining hydrolysis of components to be reduced by the reducing compound.

15. Method as in claim 13 further comprises using as a reducing compound at least one of the following hydrogen sulfide, carbon disulfide, carbonoxysulfide, mercaptan or a blend of carbon-oxygen-combination, formaldehyde, methanol, formic acid or ester of formic acid or blends thereof.

* * * * *